June 2, 1964     L. MOLLENBERG     3,135,882

FAN-COOLED DYNAMOELECTRIC MACHINE

Filed Jan. 3, 1961

Inventor:
Leroy Mollenberg
John M. Stoudt
His Attorney

United States Patent Office 3,135,882
Patented June 2, 1964

---

3,135,882
FAN-COOLED DYNAMOELECTRIC MACHINE
Leroy Mollenberg, Fort Wayne, Ind., assignor to General Electric Company, a corporation of New York
Filed Jan. 3, 1961, Ser. No. 80,371
1 Claim. (Cl. 310—57)

The present invention relates to improvements in dynamoelectric machines and more particularly to an improved cooling arrangement for such machines, especially electric motors of the totally enclosed type.

In certain applications, motors are used in connection with industrial equipment, such as tool cutting machinery, where the available space for the motor is usually limited and inaccessibly located. In addition, the motor is susceptible of coming into contact with cutting fluids, chips, and other foreign matter. Accordingly, it has become standard practice to design motors for such applications as compact units having drip proof or totally enclosed housings to prevent fluid and foreign matter from entering the internal parts of the motor.

Motors, of course, include heat generating components; e.g., stator core and excitation windings, and when the heat generating components of the motor are effectively enclosed, a major difficulty has been experienced in satisfactorily dissipating the generated heat from the interior of the motor.

If this heat is not effectively removed from the motor, it will have the general effect of increasing the resistance of the windings and the total temperature rise of the motor, thereby producing a marked decrease in motor performance. Moreover, increased operating temperatures of the motor may adversely affect the temperature sensitive motor components; e.g., winding insulation, which lose their mechanical and dielectrical strengths at high temperatures, eventually resulting in premature motor failure. Then, too, due to the inherent nature of drip proof or totally enclosed motors and the difficulty presented in providing adequate heat dissipating means, the manufacturing costs of these motors has generally been high.

Therefore, it is a principal object of the present invention to provide an improved means for cooling the interior of a dynamoelectric machine.

Another object of this invention is to provide a totally enclosed electric motor having an improved arrangement for effectively removing and dissipating the heat, which is generated within the motor, from the motor interior.

A still further object of this invention is to provide a dynamoelectric machine having an improved arrangement for cooling the interior of the machine, which uses relatively inexpensive components and which may be assembled in mass production quantities by standard low cost manufacturing techniques.

In carrying out the objects of the present invention in one form thereof, I provide a totally enclosed fan-cooled dynamoelectric machine in which an imperforate casting housing, formed of spaced apart end walls and an intermediate axial wall, surrounds a stator core. The outer surface of at least one of the end walls is provided with a plurality of spaced apart fins while the outer surface of the axial housing wall is also formed with a plurality of fins. The housing end walls rotatably carry a rotor shaft which extends through the end wall, axially beyond the radial fins and rotatably carries a fan adjacent the radial fins. An excitation winding is carried on the stator core and has end turns projecting axially beyond each side of the core, arranged in close proximity with the sides of the core and the inner surface of the housing end walls. The winding is electrically insulated from the stator core and a coating of electrical insulating material is disposed between and in intimate contact with both the winding end turns and the inner surface of the housing end walls. The material is preferably composed of a high thermal conductive thermosetting epoxy resin interspersed with non-magnetic particles of higher thermal conductivity than the resin to establish an effective thermal conductive path between the winding and the housing. The machine is also provided with means for directing the flow of cooling fluid from the fan into contact with the external surface of the housing and fins for dissipating the heat transferred from the interior of the machine thereby keeping the machine cool during operation.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

Figure 1:
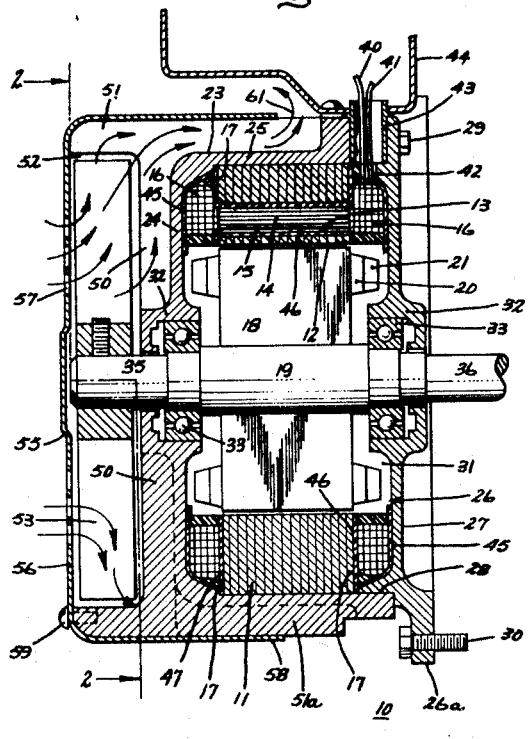
FIG. 1 is an axial view, partially in section, of a totally enclosed electric motor incorporating the present invention in one form thereof.
Figure 3:
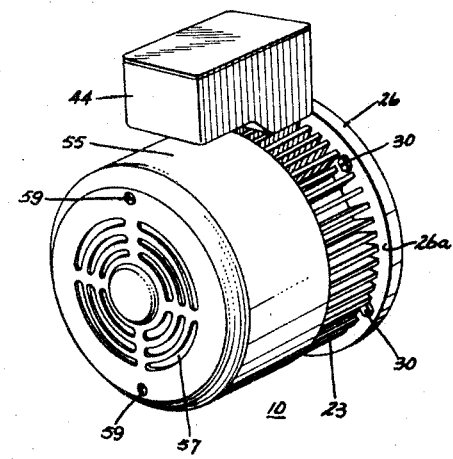
FIG. 3 is a view in perspective of the preferred embodiment of the electric motor of FIG. 1.

Referring now to the drawing in more detail, there is shown a dynamoelectric machine, generally identified by numeral 10, which for purposes of illustrating the preferred embodiment of the present invention, is shown as being of a totally enclosed fan-cooled alternating current type small horsepower electric motor. As seen in FIG. 1, the motor comprises a stator core 11 conventionally formed of a plurality of relatively thin magnetic laminations having a rotor receiving bore 12 and a plurality of inwardly opening winding slots 13 circumferentially disposed around the periphery of bore 12. An excitation winding 14, wound with a plurality of turns of enameled wire in the usual way, has coil sides 15 accommodated in the stator slots 13 and has end turns 16 projecting axially beyond each side face 17 of stator core 11. The preferred position of the winding end turns with respect to stator core 11 and the means for electrically insulating the winding from the core will be discussed hereinafter. A rotor 18, supported by a shaft 19 in bore 12 for relative rotation with stator core 11, is illustrated as being of the squirrel-cage type and as such, includes a plurality of laminations in which squirrel-cage non-magnetic bars (not shown) are positioned and electrically short circuited at each end of the rotor by cast end rings 20. A plurality of fan blades 21 may be cast integrally with the end rings to promote circulation of air internally of motor 10.

In order to provide a totally enclosed arrangement for stator 11 and rotor 18, the motor has a housing comprised of a generally cup-shaped member 23, having an outwardly extending wall portion 24 and an axial wall portion 25 which surrounds and mounts stator core 11, and a housing closure member 26 arranged at the open end of housing member 23. Closure member 26 includes an outwardly extending wall portion 27 having an annular flange 28 which is adapted to provide a rabbeted connection with the extreme end of axial wall portion 25 of housing 23. A plurality of angularly spaced apart bolts 29 extend through a circumferential portion 26a of member 26, radially outside of flange 28, into member 23 to secure the members together. Means in the form of bolts 30 are shown projecting through circumferential portion 26a of member 26 for mounting motor 10 to a stationary frame of the driven machine (not illustrated).

Both housing members 23 and 26 may be formed of any suitable material, preferably cast of heat conductive aluminum and, as seen in FIG. 1; together define a substantially imperfarote rotor and stator cavity, denoted by numeral 31. Each outwardly extending wall of the respective housing members has a bearing hub 32 formed integral therewith in which is mounted a bearing 33 for rotatably supporting rotor shaft 19. An aperture 34 is provided centrally of each hub 32 in the outwardly extending wall to permit shaft extensions 35 and 36 to extend axially beyond the respective walls 24 and 27, externally of the housing. To prevent fluid, dirt, and other foreign matter from entering motor cavity 31 at the hubs, a resilient annular gasket 37 may be provided at each opening 34, in engagement with shaft 19. A pair of insulated wire leads 40 and 41, electrically connected to winding 14, run from the winding through hole 42 provided in flange 28 of housing member 26 and tubular member 43 into a conduit box 44 which houses a conventional terminal assembly (not shown) adapted to be connected to a suitable source of power for energizing winding 14.

Still referring to FIG. 1, there is shown the preferred embodiment for establishing a highly efficient and effective thermal conductive path for transferring the heat generated in the stator core and windings during motor operation away from the interior of motor 10. In the illustrated form, winding end turns 16 are bent outwardly away from bore 12 of stator core 11 into a somewhat compact mass and are positioned in close physical proximity with the adjacent inner surface of the respective housing walls 24 and 27 to present a relatively large winding end turn surface area next to the housing. The windings are electrically insulated from the housing by a thin coating 45 of insulating material, disposed between and in intimate contact with the winding end turns 16 and the adjacent inner surface of housing walls 24 and 27. In the case of small motors, this coating is preferably on the order of 0.01 inch and may be conveniently deposited, for example, either sprayed, dipped, or brushed on the inner surface of the housing at the desired locations prior to the assembly of the stator core 11 and housing members 23 and 26. In addition to the electrical insulating characteristics, coating 45 has a high degree of thermal conductivity for conducting heat from the windings to the housing. In the preferred form, coating 45 is composed of a thermally conductive thermo-setting epoxy resin interspersed with particles of non-magnetic material having a higher thermal conductivity than that of the resin. For instance, it has been found that a coating material having a thermal conductivity, K, in the neighborhood of 0.015 (where K is measured in watts per square inch for one inch length of path per degree C. or watt/in./° C.) to be satisfactory. For example, coating 45 may consist of 50% alumina ($Al_2O_3$) particles, having a "K" of 0.73 watt/in./° C., interspersed in 50% thixotropic thermo-setting resin having a thermal conductivity of 0.008 watt/in./° C. to produce a coating of approximately 0.016 watt/in./° C. It will be recognized, of course, that the particles of the non-magnetic material should be of sufficient fineness that they will not act as an abrasive when in contact with the insulated enamel magnet wire of winding 14, thereby rubbing off the enamel and baring the wire.

In order to electrically insulate winding 14 from the stator core, side faces 17 and the walls of winding slots 13 are covered by a thin coating 46 of insulation, which may be applied by any standard manufacturing technique, for example, spraying. Preferably, coating 46 is similar in composition to that of coating 45, set forth above and a portion of the peripheral outer surface of the winding end turns 16 should be positioned next to coating 46. To augment the transfer of heat away from the windings and stator core to the housing walls, end turns 16 may be substantially encased in thermally conductive material 47 chemically and thermally compatible with the material used for coatings 45 and 46 and preferably of the same composition. Thus, the space radially above winding end turns 16, between the inner surface of the housing and the end turns, will be filled by heat conductive material 47 which serves as a carrier for assisting in the dissipation of heat from that area to the housing under operating conditions. This space should be sufficiently large to allow for variation of the lengths between the individual winding end turns.

Material 47 may be readily provided in the desired location by a centrifugal casting procedure in which stator core 11 having its windings in place in the core is initially mounted within cup-shaped housing member 23 and closure member 26 is temporarily secured at the open end of member 23. Material 47 in a plastic uncured state may then be introduced through aperture 34 into housing cavity 31, and the housing and stator core rotated so that the material will flow radially through the windings to encase them in the manner shown by FIG. 1. Thereafter, material 47 is cured, enclosure member 23 removed and the rotor and shaft assembled in the proper position with the shaft extension 35 projecting through aperture 34 of housing 23. Finally, enclosure housing 26 is secured to the end of housing 23 in the same orientation with respect to housing 23 as it originally had during the aforedescribed centrifugal casting process to insure the intimate engagement of the outer peripheral surface of end turns 16 with the adjacent coating 40 carried on the inner surface of the housing walls. Very thin shims (not illustrated), of course, may be utilized at the rabbeted connection between the respective housing members during the initial assembly thereof for the casting procedure of material 47 and omitted from the final assembly to compensate for any slight shrinkage of material 47 which might occur when it is cured or hardened.

Figure 2:
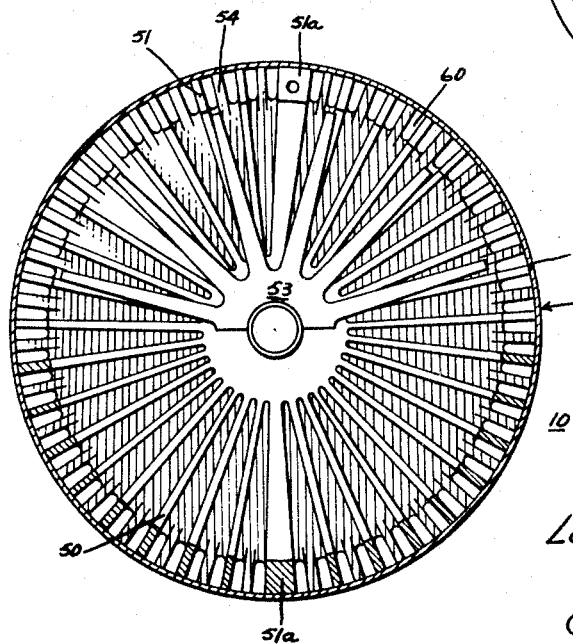
FIG. 2 is a sectional view, taken along lines 2—2 of FIG. 1.

To complete the efficient dissipation of heat from the motor when it is energized, a plurality of generally radial fins 50 are integrally formed on the external surface of housing wall 24, extending outwardly in a fan like fashion from hub 32 and are integrally joined to a plurality of axial fins 51 circumferentially arranged around the periphery of housing wall 25. Fins 51 terminate axially beyond radial fins 50, and together with the radial fins, define a fan cavity 52 in which is arranged a high velocity radial fan 53 rigidly fastened to shaft extension 35. It will be seen from FIG. 2 that a second set of axial fins, denoted by numeral 54, are alternately positioned between axial fins 51 and extend axially up to but not beyond the outer surface of housing wall 24 serving to increase the total heat radiating surface of the motor housing and to provide a good flow pattern for the circulation of cooling fluid such as air by fan 53.

An outer generally cup-shaped enclosing end shell 55 is provided for directing the coolant or air into contact with the fins. In the illustrated form, shell 55 includes an outwardly extending portion 56 having a number of openings 57 for admitting air to the fan 53 and an axially extending flange portion 58 surrounding a major part of the axial length of fins 51 and 54. Shell 55 is attached to housing member 23 by a pair of screws 59 which fasten into fins 51a of enlarged cross section. As most clearly seen in FIG. 2, the inner wall of shell portion 58 and the axial fins of the housing form passageways 60 through which the air will be circulated from fan 53.

During operation of the motor, the heat generated internally thereof will be conducted to the housing through the high thermal conductive thin coatings 45, 46 and material 47. In addition, rotor fan 21 forces the air contained within the open confines of cavity 31 into contact with the exposed inner housing wall surfaces and coating 45 to assist in transferring heat, internally of cavity 31, to the housing walls; this heat is in turn conducted through the walls of housing member 23 to the external surface of the housing and the axial and radial fins.

Air is drawn into the fan cavity 52 by fan 53 through shell openings 57 and is forced against the outer periphery of housing member 23 at a high velocity in the manner indicated by the arrows in FIG. 1. This air circulates over the external surface of housing member 23 as well as radial fins 50 and axial fins 51, 51a and 54, and abstracts heat therefrom. The heated air is discharged from passageways 60 as shown by arrows 61.

It will now be readily apparent that this invention provides an improved cooling arrangement, especially suitable for use in totally enclosed or drip proof type dynamoelectric machines, by which heat is efficiently transferred away from the interior parts of the machine, thereby keeping the machine relatively cool even though it may be totally enclosed. In addition, the machine may be economically produced by simple and conventional manufacturing techniques and a maximum abstraction of heat from the machine is effected without the use of expensive component parts while keeping the over-all size of the machine at a minimum.

While I have shown and described the specific embodiment of the present invention, it is to be understood that modifications may be made by those skilled in the art without actually departing from the invention. I therefore aim in the appended claims to cover all such equivalent variations as come within the true spirit and scope of the invention.

What I claim as new and desire to secure by Letters Patent of the United States is:

A totally enclosed fan cooled dynamoelectric machine comprising a housing of cup-shape design having an end wall and an integrally formed axially extending wall of cylindrical configuration, a closure member fitted in fluid tight relationship with the housing to form a closed rotor and stator cavity, a rotor and stator equipped with windings positioned in said cavity, said stator winding including axially projecting end turns having their outer surfaces in close proximity to the housing inner walls, said rotor being mounted on a shaft having its ends projecting respectively through the end wall and closure member, fan blades on the rotor for circulating air in the cavity, a multitude of radially disposed fins formed on the surfaces of the end wall and closure member for dissipating heat during machine operation, a plurality of axially extending fins on the axial wall merged with the radial fins but extending outwardly therefrom a greater axial distance, a thin coating of insulation on the inner portions of the housing walls and in the stator slots for electrically isolating the stator winding therefrom, said insulation including non-magnetic particles of high thermal conductivity for facilitating transfer of heat from the rotor and stator and windings through the housing wall to the fins, a cup-shaped shell having air admission openings therein attached to said housing and having a cylindrical flange spaced from and overlying said axial fins but extending a major portion of their length, a fan on the rotor shaft mounted between said shell and the housing end wall for drawing cooling air through said openings and into heat exchange relationship with the fins on the end wall prior to being forced between said flange and the axially extending fins for carrying away heat transmitted thereto by the heat generating parts of the machine during operation.

References Cited in the file of this patent
UNITED STATES PATENTS

| | | |
|---|---|---|
| 1,916,339 | Smith | July 4, 1933 |
| 2,883,566 | Briggs | Apr. 21, 1959 |
| 2,967,959 | Waters | Jan. 10, 1961 |